United States Patent
Watanabe (10) Patent No.: US 10,604,010 B2
(45) Date of Patent: Mar. 31, 2020

(54) BEHAVIOR CONTROL DEVICE FOR FOUR-WHEEL DRIVE VEHICLE

(71) Applicant: TOYOTA JIDOSHA KABUSHIKI KAISHA, Toyota-shi, Aichi (JP)

(72) Inventor: Ryochi Watanabe, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 127 days.

(21) Appl. No.: 15/794,828

(22) Filed: Oct. 26, 2017

(65) Prior Publication Data

US 2018/0118024 A1 May 3, 2018

(30) Foreign Application Priority Data

Nov. 2, 2016 (JP) ................................ 2016-215263

(51) Int. Cl.
| | |
|---|---|
| F16H 48/20 | (2012.01) |
| B60K 17/35 | (2006.01) |
| B60K 23/08 | (2006.01) |
| B60K 23/04 | (2006.01) |
| F16H 48/22 | (2006.01) |
| B60K 17/346 | (2006.01) |

(52) U.S. Cl.
CPC .......... *B60K 17/3505* (2013.01); *B60K 23/04* (2013.01); *B60K 23/0808* (2013.01); *F16H 48/22* (2013.01); *B60K 17/346* (2013.01); *B60K 2023/043* (2013.01); *B60K 2023/0816* (2013.01); *F16H 2048/205* (2013.01)

(58) Field of Classification Search
CPC .............................................. F16H 2048/205
See application file for complete search history.

(56) References Cited

U.S. PATENT DOCUMENTS

| 6,189,643 B1 | 2/2001 | Takahashi et al. | |
| 2002/0007239 A1* | 1/2002 | Matsumoto | B60K 23/0808 701/41 |

(Continued)

FOREIGN PATENT DOCUMENTS

| JP | H08-053058 A | 2/1996 |
| JP | H11-123946 A | 5/1999 |

OTHER PUBLICATIONS

U.S. Appl. No. 15/892,946, filed Feb. 9, 2018 in the name of Watanabe.

(Continued)

*Primary Examiner* — Tisha D Lewis
(74) *Attorney, Agent, or Firm* — Oliff PLC (57) ABSTRACT

A behavior control device for a four-wheel drive vehicle that is applied to a vehicle which includes a center differential device that transmits a driving force from a driving device to front and rear wheel rotation shafts, and permits differential of the front and rear wheel rotation shafts; and a braking force distribution ratio of the front and rear wheels being set to a value in which a proportion of front wheels is larger than that in an ideal distribution ratio. The behavior control device includes a differential limiting device that changes the limitation degree of a differential between the wheel rotation shafts, and a control unit that controls the differential limiting device to increase the limitation degree of the differential during the vehicle is braked as a degree of an understeer state of the vehicle is high.

15 Claims, 7 Drawing Sheets

(56) References Cited

U.S. PATENT DOCUMENTS

| | | | | |
|---|---|---|---|---|
| 2003/0218378 A1* | 11/2003 | Tanaka | ................ | B60T 8/1755 |
| | | | | 303/146 |
| 2004/0267427 A1* | 12/2004 | Suzuki | ................ | B60T 8/1755 |
| | | | | 701/69 |
| 2007/0213913 A1* | 9/2007 | Ushiroda | .............. | B60T 8/1755 |
| | | | | 701/82 |
| 2010/0023184 A1* | 1/2010 | Yamamura | ............ | F16H 37/082 |
| | | | | 701/1 |
| 2011/0314960 A1* | 12/2011 | Yoshimura | ............. | B60K 6/445 |
| | | | | 74/650 |

OTHER PUBLICATIONS

Jun. 7, 2019 Notice of Allowance and Fee(s) Due issued in U.S. Appl. No. 15/892,946.

* cited by examiner

BEHAVIOR CONTROL DEVICE FOR FOUR-WHEEL DRIVE VEHICLE

CROSS-REFERENCE TO RELATED APPLICATION

The disclosure of Japanese Patent Application NO. JP2016-215263 filed on Nov. 2, 2016 is incorporated by reference in its entirety.

BACKGROUND

1. Technical Field

The present disclosure relates to a behavior control device for a four-wheel drive vehicle such as an automobile.

2. Description of the Related Art

A differential limiting control unit is generally provided in a center differential device of a four-wheel drive vehicle. For example, as described in the Japanese Patent Application Laid-open No. H11-123946, a differential limiting control unit is known which controls a differential limitation degree according to a magnitude of a braking force when an accelerator is turned off while traveling in four-wheel drive mode. In this differential limiting control unit, a differential limitation is maintained when a braking force at the time when the accelerator is turned off is smaller than a braking force that generates a lock of a wheel, and the differential limitation is canceled when a braking force at the time when the accelerator is turned off is larger than a braking force that generates a lock of a wheel.

According to the control by the above-mentioned differential limiting control unit, when a braking force at the time when the accelerator is turned off is small, the differential of the front and rear wheels is suppressed, so that a running state of the vehicle can be maintained in a stable understeer state. While on the other hand, when a braking force at the time when the accelerator is turned off is large, the differential between the front and rear wheels is permitted, so that a braking force can be controlled for each wheel, and even if there arises a possibility of locking on any one of the wheels, it is possible to reduce the possibility that the wheel is locked by an anti-skid control without affecting the rotational speeds of the other wheels.

SUMMARY

By the way, in a vehicle such as an automobile, ground contact loads of front wheels are higher than ground contact loads of rear wheels and if a braking force of the rear wheels is excessively increased, the vehicle tends to spin more easily, so that the front-rear distribution ratio of braking forces is set to a value that is shifted toward the front wheels than an ideal distribution ratio based on a contact load ratio of the front and rear wheels. For this reason, when the vehicle is braked while turning on a road having a road surface with a low coefficient of friction, for example, a degree of an understeer state may become high for the reason that a braking force of the front wheels is increased and a lateral force of the front wheels is decreased.

However, in the differential limiting control unit described in the above-mentioned publication, a limitation degree of the differential is controlled in accordance with a magnitude of the braking force at the time when the accelerator is turned off and is not controlled depending on a behavior state of the vehicle. Therefore, the differential limiting control unit described in the above-mentioned publication cannot prevent a lowering in running performance of the four-wheel drive vehicle at the time of braking when turning, especially an increase in the degree of understeer condition.

The present disclosure provides a behavior control device that is improved to prevent an increase in the degree of understeer state at the time of braking when turning in a four wheel drive vehicle in which a braking force distribution ratio of front and rear wheels is set to a value in which a ratio of front wheels is larger than that in an ideal distribution ratio based on a contact load ratio of the front and rear wheels.

According to the present disclosure, there is provided a behavior control device for a four-wheel drive vehicle that is applied to a vehicle which comprises a driving device; a center differential device that transmits a driving force from the driving device to a front wheel rotation shaft and a rear wheel rotation shaft, and permits differential of the front wheel rotation shaft and the rear wheel rotation shaft; and a behavior estimation device for estimating a behavior of the vehicle; the braking force distribution ratio of the front and rear wheels being set to a value in which a ratio of front wheels is larger than that in an ideal distribution ratio based on a ground load ratio of the front and rear wheels; the behavior control device comprising a differential limiting device that changes a limitation degree of a differential between the front wheel rotation shaft and the rear wheel rotation shaft, and a control unit that controls the differential limiting device, and being configured to control a behavior of the vehicle during braking.

The control unit is configured to control the differential limiting device to increase the limitation degree of the differential during the vehicle is braked when a behavior of the vehicle estimated by the behavior estimation device is an understeer state.

According to the above configuration, when the behavior of the vehicle is an understeer state, the differential limiting device is controlled to increase the limitation degree of the differential during the vehicle is braked. When the limitation degree of the differential is increased, a difference between wheel speeds of the front and rear wheels becomes 0 or a small value, and braking slip rates of the front and rear wheels approach the same value, so that a braking force distribution of the front and rear wheels approaches an ideal distribution. Accordingly, a braking force of the front wheels decreases and a braking force of the rear wheels increases. As a result, a lateral force of the front wheels increases accordingly and a lateral force of the rear wheels decreases, which enables to reduce a degree of an understeer behavior of the vehicle.

Aspects of the Present Disclosure

In one aspect of the present disclosure, the control unit is configured to increase the degree of increase in the limitation degree of the differential as a degree of understeer state of the vehicle is higher.

According to the above aspect, the degree to which the limitation degree of the differential is increased as the degree of an understeer state of the vehicle is higher. Therefore, it is possible to reduce the possibility of excess or deficiency in the effect of lowering the degree of understeer behavior of the vehicle, as compared to where an amount by which the degree of differential limitation is increased is constant irrespective of the degree of an understeer state of the vehicle.

It is to be noted that in the four-wheel drive vehicle to which the present disclosure is applied, in the region of the normal braking force other than the area of the very high braking force such as the braking force at the time of emergency braking, the braking force distribution ratio of the front and rear wheels may be set to a value in which a ratio of the front wheels is higher than the ideal distribution ratio.

In one embodiment of the present disclosure, the control unit is configured to set a target limitation degree of the differential so that the higher the degree of the understeer state of the vehicle at the time when braking is started, the higher the target limitation degree of the differential is set, and to control the differential limiting device such that the limitation degree of the differential conforms to the target limitation degree when the vehicle is braked.

According to the above aspect, the target limitation degree of the differential is set so that the higher the degree of an understeer state of the vehicle at the time when braking is started, the higher the target limitation degree of the differential is set, and the differential limiting device is controlled such that the limitation degree of the differential conforms to the target limit degree when the vehicle is braked. Therefore, the limitation degree of the differential at the time when the vehicle is braked is increased according to the degree of the understeer state of the vehicle at the time when braking is started. Therefore, it is possible to set the limitation degree of the differential according to the degree of an understeer state of the vehicle at the time when braking is started.

In another aspect of the present disclosure, the control unit is configured to calculate a drift state quantity indicative of a drift state of the vehicle, and to calculate a change amount of a drift state quantity in an oversteer direction from a drift state quantity at the time when braking is started, and to control the differential limiting device to reduce the limitation degree of the differential when the limitation degree of the differential is made high and it is determined that the change amount is higher than a reference value in a situation where the vehicle is braked.

According to the above aspect, when it is determined that a change amount of a drift state quantity is higher than the reference value in a situation where the limitation degree of the differential is high and the vehicle is braked, the differential limiting device is controlled so that the limitation degree of the differential is reduced. Therefore, it is possible to effectively prevent a degree of an oversteer state of the vehicle from being increased due to a situation where the degree of differential limitation is high is maintained excessively long.

Furthermore, according to another aspect of the present disclosure, the control unit is configured to variably set the reference value based on a degree of the understeer state of the vehicle at the time when the braking is started so that the greater the degree of the understeer state of the vehicle at the time when the braking is started is, the larger the reference value is.

According to the above aspect, the reference value is variably set on the basis of a degree of the understeer state of the vehicle at the time when braking is started. Therefore, based on a degree of the understeer state of the vehicle at the time when braking is started, the reference value for lowering the limitation degree of the differential can be variably set so that the greater the degree of the understeer state of the vehicle at the time when braking is started, the greater the reference value is. Accordingly, it is possible to reduce a possibility of occurrence of a situation in which the limitation degree of the differential is started to decrease at a stage when the vehicle is not in an oversteer state, or the reduction of the limitation degree of the differential is not started despite the vehicle is in an oversteer state.

Further, according to another aspect of the present disclosure, the control unit is configured to control the differential limiting device to reduce the limitation degree of the differential when a predetermined time has elapsed from a time point when the limitation degree of the differential is increased.

According to the above aspect, when a predetermined time has elapsed from a time point when the differential limitation degree is increased, the differential limiting device is controlled so as to reduce the limitation degree of the differential. Therefore, it is possible to effectively prevent a degree of an oversteer state of the vehicle from being increased due to a situation where a limitation degree of the differential is high is maintained excessively long.

Furthermore, in another aspect of the present disclosure, the control unit is configured to increase a degree in reducing the limitation degree of the differential as a degree of an oversteer state of the vehicle is higher.

According to the above aspect, as a degree of an oversteer state of the vehicle is higher, the degree of lowering the limitation degree of the differential is increased. Therefore, the higher a degree of an oversteer state of the vehicle, the higher the effect of preventing the degree of oversteer state of the vehicle from being high. Therefore, for example, as compared to where the degree of reduction in the limitation degree of the differential is constant irrespective of a degree of an oversteer state of the vehicle, a possibility can be reduced that the effect of preventing a degree of an oversteer state of the vehicle from becoming excessively excessive or insufficient.

Other objects, other features and attendant advantages of the present disclosure will be readily understood from the description of the embodiments of the present disclosure described with reference to the following drawings.

DETAILED DESCRIPTION OF THE DISCLOSURE

Several embodiments of the present disclosure will be described in detail with reference to the attached drawings.

First Embodiment

Figure 1:
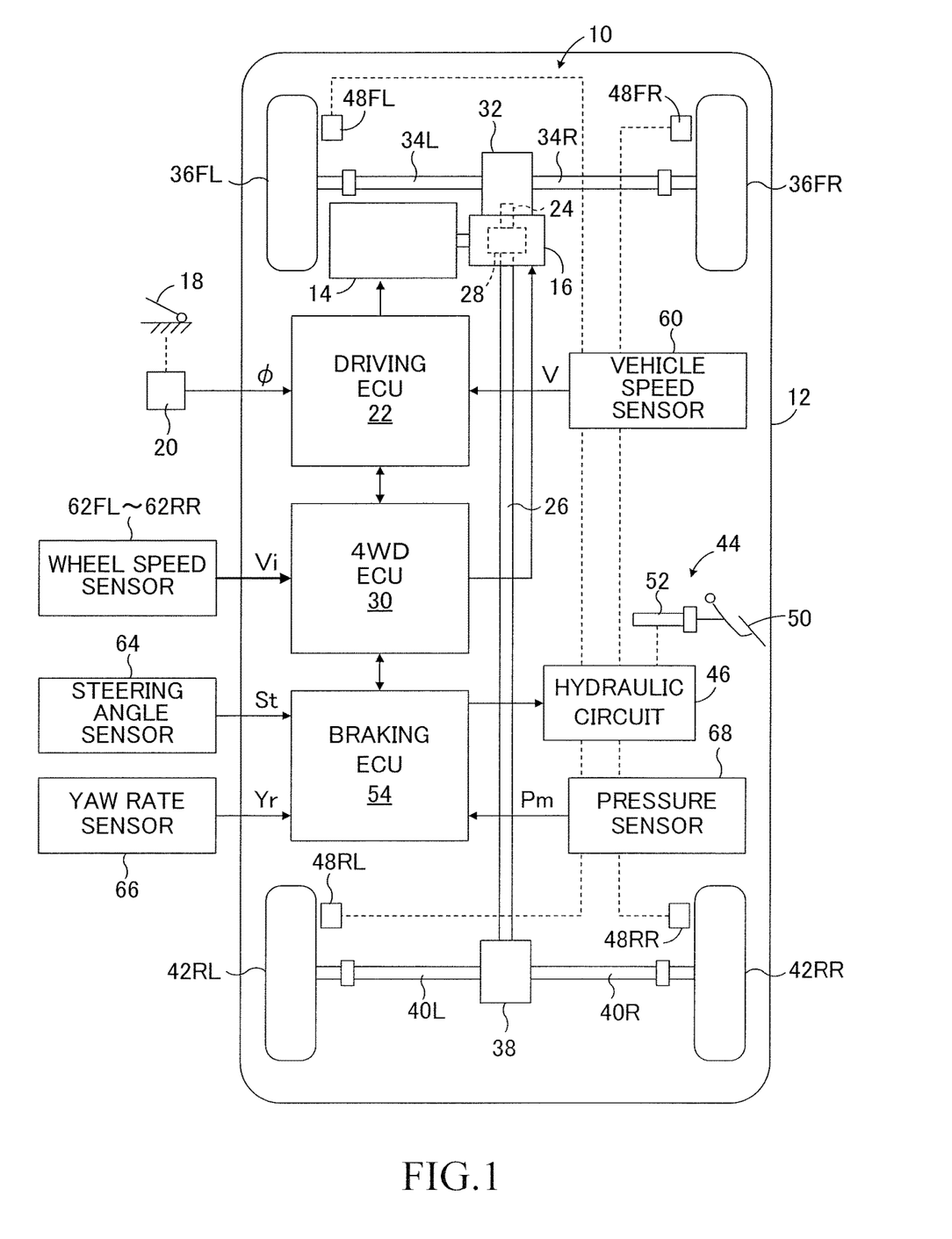
FIG. 1 is a schematic configuration diagram showing a first embodiment of a behavior control device for a four-wheel drive vehicle according to the present disclosure.

FIG. 1 is a schematic configuration diagram showing a behavior control apparatus 10 of a four-wheel drive vehicle according to a first embodiment of the present disclosure.

In FIG. 1, a four-wheel drive vehicle 12 to which the behavior control apparatus 10 is applied has a driving device 14 and a center differential device 16. The four-wheel drive vehicle 12 is simply expressed as "vehicle 12" as necessary and four wheel drive is expressed as 4WD as necessary. The driving device 14 may be any driving device for a vehicle known in the art, such as a combination of an internal combustion engine and a transmission common in a vehicle such as a car, or a hybrid system that is a combination of an internal combustion engine, a motor and a transmission device. The vehicle 12 is provided with an accelerator pedal 18 operated by a driver and an accelerator pedal 18 is provided with an accelerator opening degree sensor 20 for detecting a depression amount thereof as an accelerator opening degree φ. A signal indicative of an accelerator opening degree φ is input to a driving electronic control unit 22, and an output of the driving device 14 is controlled by the electronic control unit 22 according to the accelerator opening degree φ and the likes.

The center differential device 16 transmits a driving force from the driving device 14 to a front wheel rotation shaft 24 and a rear wheel rotation shaft (propeller shaft) 26, and is configured to allow a difference in rotational speed between the front wheel rotation shaft 24 and the rear wheel rotation shaft 26. In the illustrated embodiment, the center differential device 16 incorporates an electronically controlled differential limiting device 28.

The differential limiting device 28 controls the restraining force given to the front wheel rotation shaft 24 and the rear wheel rotation shaft 26 by a center coupling to thereby change the limitation degree of the difference in rotational speed between the rotation shafts 24 and 26. The mutual restraining force given to the front wheel rotation shaft 24 and the rear wheel rotation shaft 26, and therefore a coupling torque Tcu of the center coupling, is controlled by a 4WD electronic control unit 30, as will be described in detail later.

The driving force of the front wheel drive shaft 24 is transmitted to the left front wheel axle 34L and the right front wheel axle 34R by the front wheel differential 32, whereby the left and right front wheels 36FL and 36FR are rotationally driven. Similarly, the driving force of the rear wheel drive shaft 26 is transmitted to the left rear wheel axle 40L and the right rear wheel axle 40R by the rear wheel differential 38, whereby the left and right rear wheels 42RL and 42RR are rotationally driven. The front wheels 36FL and 36FR are steered by a steering device, not shown in FIG. 1.

Braking forces of the left and right front wheels 36FL, 36FR and the left and right rear wheels 42RL, 42RR are controlled by controlling braking pressures of corresponding wheel cylinders 48FL, 48FR, 48RL, 48RR by a hydraulic circuit 46 of a braking device 44. Although not shown in the drawing, the hydraulic circuit 46 includes a reservoir, an oil pump, various valve devices, and the like, and functions as a brake actuator. As will be described later, the braking pressure of each wheel cylinder is controlled by a braking electronic control unit 54 based on a pressure in a master cylinder 52, which is normally driven in accordance with the driver's depression of a brake pedal 50, and the braking pressures are individually controlled as necessary.

In addition to a signal indicative of the accelerator opening degree φ, a signal indicating a vehicle speed V is input from a vehicle speed sensor 60 to the driving electronic control unit 22. Wheel speeds Vi (i=fl, fr, rl and rr) of the left and right front wheels 36FL, 36FR and the left and right rear wheels 42RL, 42RR are input from wheel speed sensors 62FL, 62FR, 62RL, 62RR to the 4WD electronic control unit 30. Further, to the braking electronic control unit 54, a signal indicating a steering angle St detected by a steering angle sensor 64, a signal indicating a yaw rate Yr of the vehicle detected by a yaw rate sensor 66, and a signal indicating a master cylinder pressure Pm detected by a pressure sensor 68 are input. Steering angle St and yaw rate Yr detected respectively by the steering angle sensor 64 and the yaw rate sensor 66 assume positive when turning direction of the vehicle is left.

The driving electronic control unit 22, the 4WD electronic control unit 30, and the braking electronic control unit 54 each have a CPU, a ROM, a RAM, and an input/output port unit, and they may include computers that are connected to each other by a bidirectional common bus. Programs for executing such as drive control, four-wheel drive control and braking control are stored in ROMs of corresponding microcomputers, and each control is executed by the CPU according to the program. Furthermore, the electronic control units 22, 30 and 54 exchange necessary signals with each other. In FIG. 1, the "electronic control unit" is denoted as "ECU".

The braking electronic control unit 54 calculates target braking forces Fbflt, Fbfrt, Fbrlt, and Fbrrt of the front wheels 36FL, 36FR and the rear wheels 42RL, 42RR on the basis of the master cylinder pressure Pm, and controls braking pressures of the wheel cylinders 48FL, 48FR, 48RL and 48RR so that the braking forces of the respective wheels conform to the respective target braking forces. In consideration of manufacture tolerances of parts of the braking device 44, the braking force distribution ratio of the front and rear wheels is controlled, as indicated by the solid line in FIG. 2, so that the ratio of the front wheels is larger than that the ratio of an ideal distribution line (broken line) determined based on the ground load of the front wheels 36FL, 36FR and the rear wheels 42RL, 42RR. That is, the target braking force Fbft of the front wheels 36FL and 36FR is controlled to be higher than the braking force of the front wheels determined based on the ideal distribution of the braking forces of the front and rear wheels and higher than the target braking force Fbrt of the rear wheels 42RL and 42RR.

Figure 3:
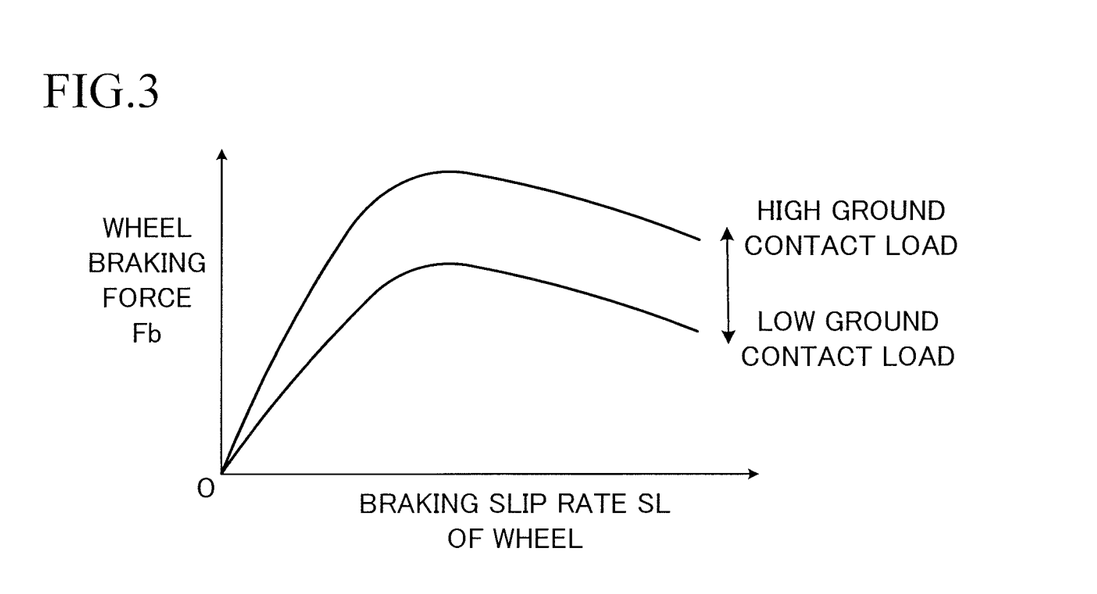
FIG. 3 is a graph showing a relationship between a braking slip rate SL of a wheel and a ground contact load of a wheel and a braking force Fb of a wheel.

As shown in FIG. 3, a braking force of a wheel increases as the braking slip ratio increases in a range where the braking slip ratio is not larger than a predetermined braking slip ratio determined by characteristics of a tire or the like, but decreases as the braking slip ratio increases in a range where braking slip ratio is larger than the predetermined braking slip ratio. Therefore, the braking electronic control unit 54 calculates the braking slip rates of the wheels based on the wheel speeds Vi of the respective wheels, and executes an anti-skid control known in the art that is referred to as "ABS control" as necessary, so as to prevent the braking slip rates of the wheels from becoming excessive.

Figure 4:
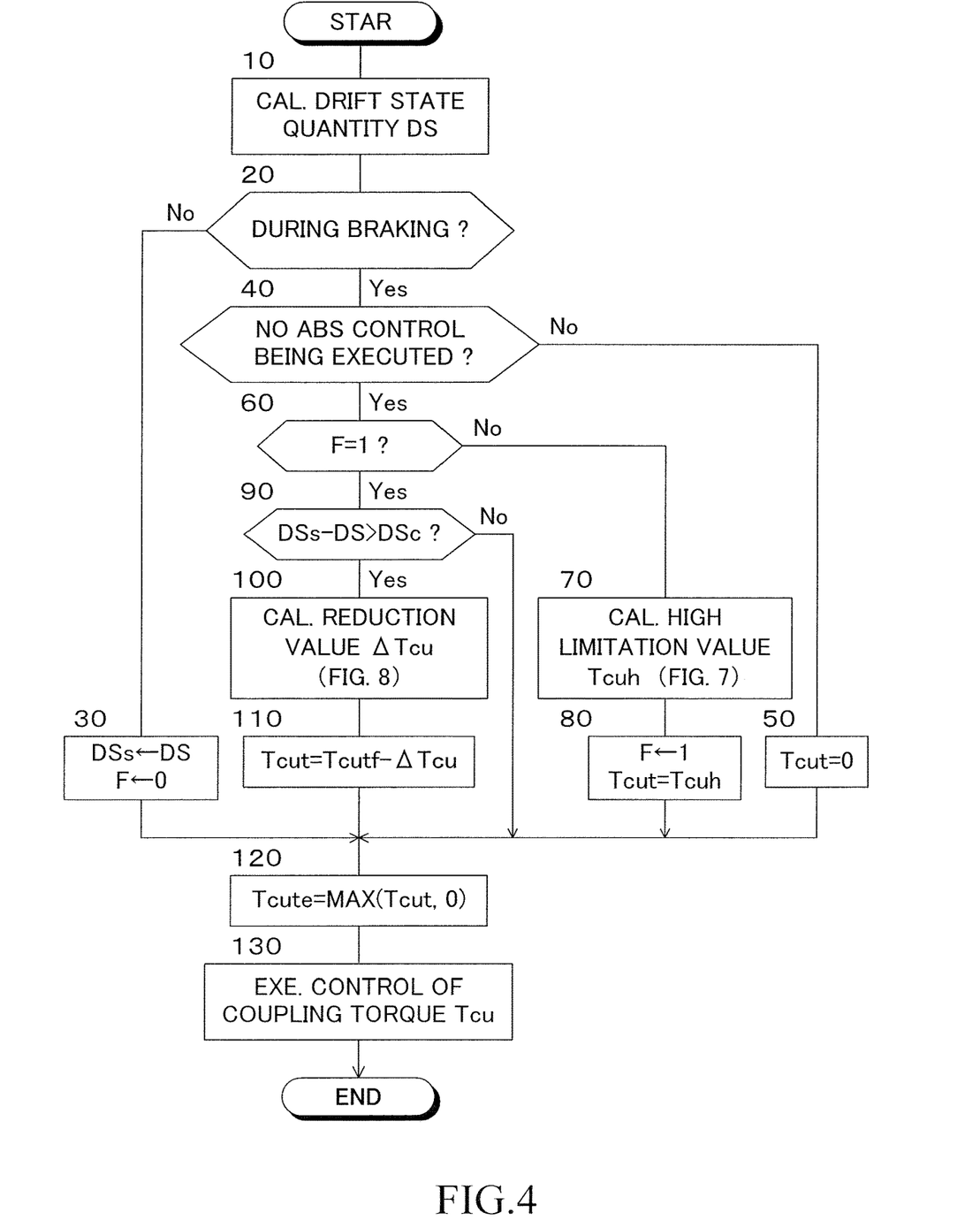
FIG. 4 is a flowchart showing a control routine of a coupling torque in the first embodiment.

When the vehicle 12 is braked, the 4WD electronic control unit 30 controls the coupling torque Tcu of the center coupling in the differential limiting device 28 in accordance with the flowchart shown in FIG. 4. The differential limiting device 28 permits relative rotation between the front wheel rotation shaft 24 and the rear wheel rotation shaft 26 when the coupling torque Tcu is 0, and prevents relative rotation between the front rotation shaft 24 and the rear wheel rotation shaft 26 when the coupling torque Tcu is the maximum value Tcumax. Further, the differential limiting device 28 gradually increases the degree of differential limitation of the rotary shafts 24 and 26 as the coupling torque Tcu increases when the coupling torque Tcu is a value between 0 and the maximum value Tcumax.

Therefore, the coupling torque Tcu is an index value indicating a degree of differential limitation of the differential limiting device 28, and a target coupling torque Tcut described later is an index value indicating a target differential limitation degree of the differential limiting device 28.

Figure 5:
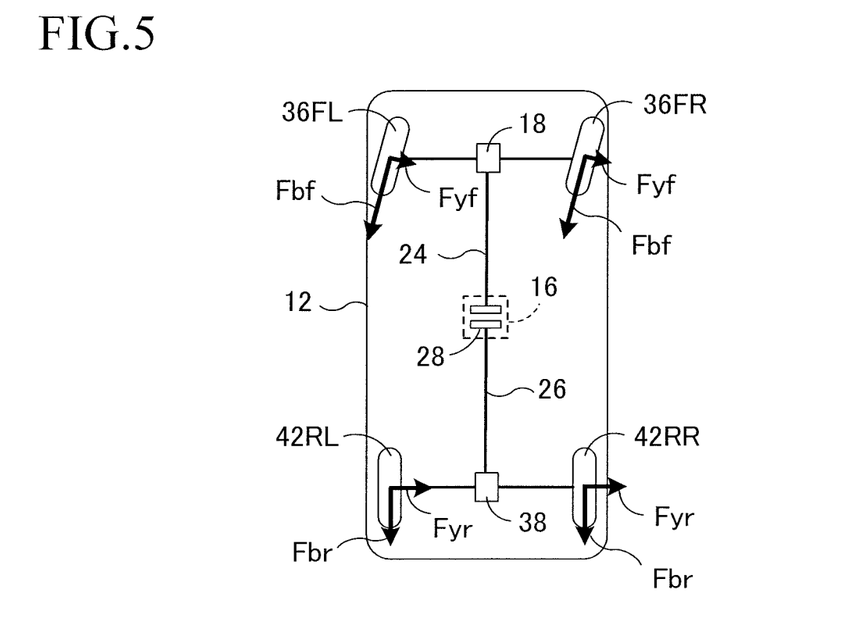
FIG. 5 is a view showing a braking force and a lateral force of each wheel for a case where the coupling torque Tcu is controlled to be 0 or a value close to 0 while the vehicle is turning and braked.

As shown in FIG. 5, since a front/rear distribution ratio of the braking force is set to be toward the front wheels when the coupling torque Tcu is controlled to be 0 or a value close to 0 during turning braking of the vehicle 12, a braking force Fbf of the front wheels 36FL and 36FR is larger and a braking force Fbr of the rear wheels 42RL and 42RR is smaller. Therefore, a lateral force Fyf of the front wheels is smaller and a lateral force Fyr of the rear wheels is larger. Therefore, the behavior of the vehicle 12 tends to be understeer behavior.

Figure 6:
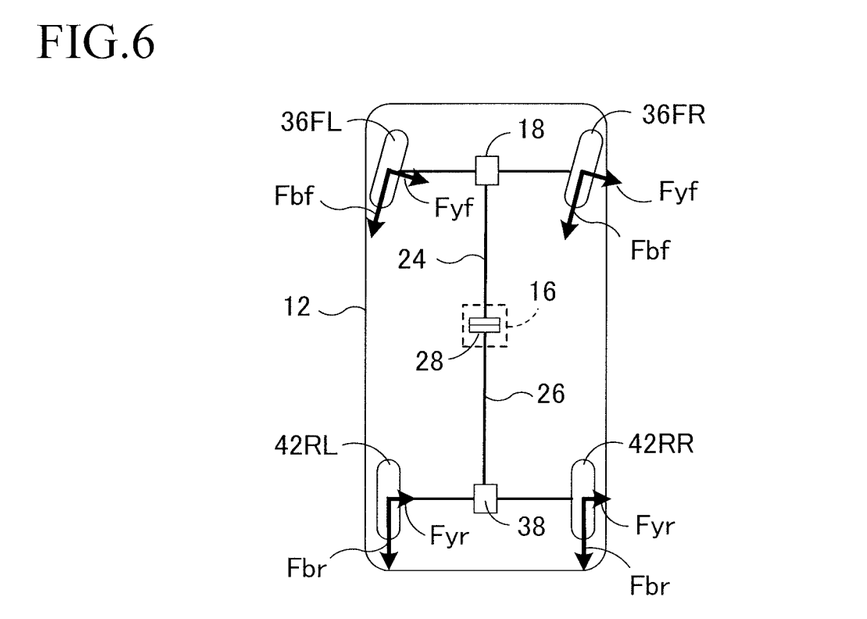
FIG. 6 is a view showing a braking force and a lateral force of each wheel for a case where the coupling torque Tcu is controlled to a maximum value Tcumax or a value close to the maximum value Tcumax during the vehicle is braked.

On the other hand, as shown in FIG. 6, when the coupling torque Tcu is controlled to the maximum value Tcumax or a value close thereto during turning braking of the vehicle 12, a difference in wheel speed between the front wheels 36FL, 36FR and the rear wheels 42RL, 42RR becomes 0 or a small value. Therefore, since the braking slip rates of the front wheels and the rear wheels are substantially the same, the braking forces of the front wheels and the rear wheels are distributed to the distribution line indicated by the one-dot chain line close to the ideal distribution line shown by the broken line in FIG. 2.

Figure 2:
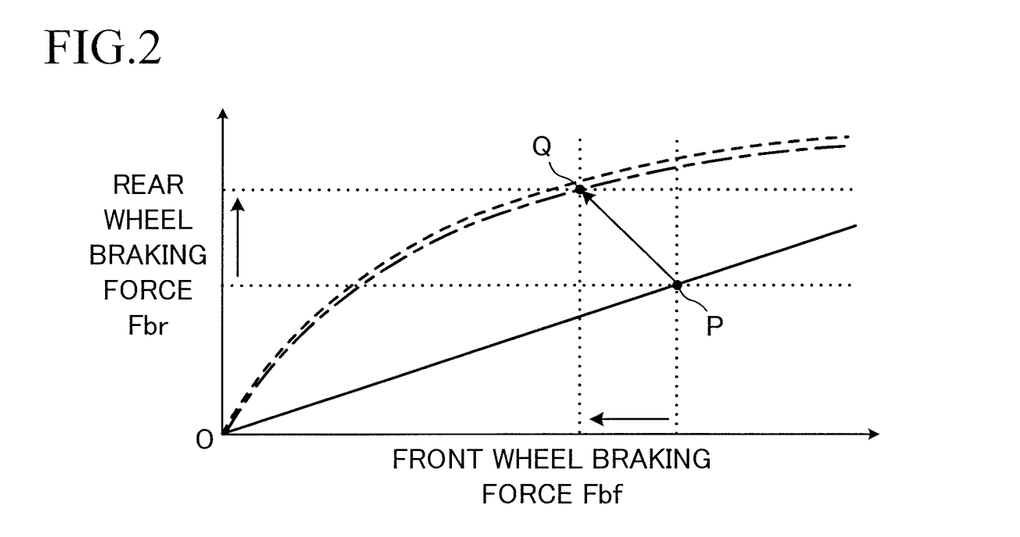
FIG. 2 is a graph showing a relationship between a front wheel braking force Fbf and a rear wheel braking force Fbr in the four-wheel drive vehicle of the first embodiment.

For example, if a braking force Fbf of the front wheels and a braking force Fbr of the rear wheels are values indicated by a point P in FIG. 2, the braking forces Fbf and Fbr change to the values indicated by a point Q in FIG. 2. Therefore, the braking force Fbf of the front wheels 36FL and 36FR decreases and the braking force Fbr of the rear wheels 42RL and 42RR increases. Accordingly, the lateral force Fyf of the front wheels increases and the lateral force Fyr of the rear wheels decreases, resulting in that the degree of understeer behavior of the vehicle 12 decreases.

<Coupling Torque Control Routine>

Next, a control routine of the coupling torque in the first embodiment will be described with reference to the flowchart shown in FIG. 4. The control of the coupling torque according to the flowchart shown in FIG. 4 is repeatedly executed at predetermined time intervals when the ignition switch (not shown) is on. In the following description, the control of the coupling torque according to the flowchart shown in FIG. 4 is simply referred to as "the control". This also applies to the second embodiment to be described later. Further, a flag F is a flag concerning whether or not the coupling torque Tcu is being controlled during braking of the vehicle, and is initialized to 0 at the start of the control.

First, in step 10, a reference yaw rate Yrn of the vehicle is calculated according to the following equation (1), assuming that an overall gear ratio of the steering device of the vehicle 12 is N, a wheel base of the vehicle is L, and a stability factor of the vehicle is Kh. A target yaw rate Yrt of the vehicle, which is a first-order lag transient yaw rate with respect to the reference yaw rate Yrn, is calculated according to the following equation (2), assuming that a time constant of a first-order low-pass filter is Ty and a Laplace operator is s. Further, assuming sign Yr is a sign of a yaw rate Yr of the vehicle, a the drift state quantity DS of the vehicle indicating a drift state of the vehicle is calculated according to the following equation (3).

$$Yrn = \frac{VSt}{NL} \cdot \frac{1}{1 + KhV^2} \tag{1}$$

$$Yrt = \left(\frac{VSt}{NL} \cdot \frac{1}{1 + KhV^2}\right) \frac{1}{1 + Ty \cdot s} \tag{2}$$

$$DS = \text{sign}Yr(Yrt - Yr) \tag{3}$$

When the drift state quantity DS is a positive value, it indicates that the vehicle is in an understeer state, and the larger the absolute value of the quantity is, the higher the degree of the understeer state is. On the other hand, when the drift state quantity DS is a negative value, it indicates that the vehicle is in an oversteer state, and the larger the absolute value of the quantity is, the higher the degree of the oversteer state is. Therefore, step 10 functions as a behavior estimation device that estimates a behavior of the vehicle by estimating whether or not the vehicle is in an understeer state or an oversteer state.

In step 20, it is determined whether or not a braking operation is being performed by a driver, for example, by determining whether or not a master cylinder pressure Pm is equal to or greater than a reference value Pm0 (a positive constant). When an affirmative determination is made, the control proceeds to step 40. When a negative determination is made, in step 30, a drift state quantity DSs immediately before the braking start is set to a drift state quantity DS and the flag F is reset to 0 indicating that the coupling torque Tcu during braking is not being controlled), and then the control proceeds to step 120.

In step 40, it is determined whether or not braking force control by ABS control is not performed for any of the wheels. When an affirmative determination is made, the control proceeds to step 60. When a negative determination is made, in step 50, a target coupling torque Tcut of the center coupling in the differential limiting device 28 is set to 0, and then the control proceeds to step 120.

In step 60, it is determined whether or not the flag F is 1, that is, it is determined whether or not the coupling torque Tcu during the braking of the vehicle is being controlled. When an affirmative determination is made, the control proceeds to step 90, and when a negative determination is made, the control proceeds to step 70.

Figure 7:
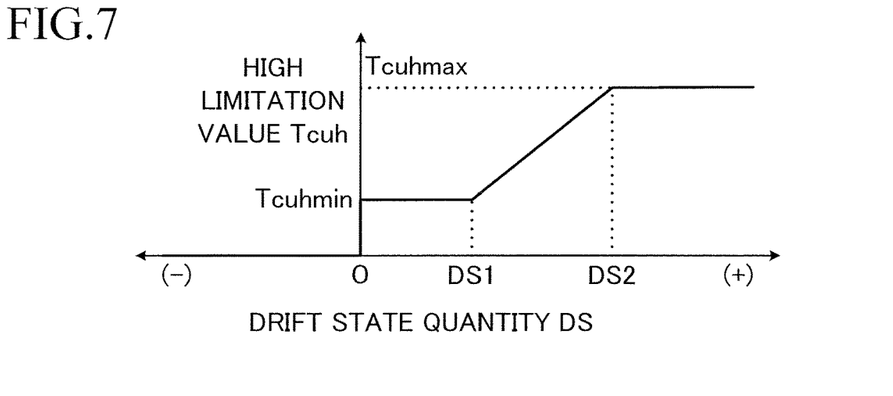
FIG. 7 is a map for calculating the high limit value Tcuh of the coupling torque Tcu based on the drift state quantity DS.

In step 70, a high limit value Tcuh of the coupling torque Tcu is calculated by referring to the map shown in FIG. 7 based on the drift state quantity DS. As shown in FIG. 7, the high limit value Tcuh is calculated as a minimum value Tcuhmin when the drift state quantity DS is equal to or less than a first reference value DS1, and is calculated as a maximum value Tcuhmax when the drift state quantity DS is equal to or higher than a second reference value DS 2. Further, when the drift state quantity DS is larger than the first reference value DS 1 and smaller than the second reference value DS 2, the high limit value Tcuh is calculated so as to gradually increase as the drift state quantity DS increases.

In step 80, the flag F is set to 1 and the target coupling torque Tcut of the center coupling is set to the high limit value Tcuh, and then the control proceeds to step 120.

In step 90, it is determined whether or not a deviation DSs-DS (an change amount of the drift state quantity DS from the drift state quantity DSs immediately before the braking start in the oversteer direction) between the drift state quantity DSs and the drift state quantity DS is higher than a reference value DSc (a positive value that is not smaller than DS). When a negative determination is made, the control proceeds to step 120, and when an affirmative determination is made, the control proceeds to step 100.

The reference value DSc may be a preset positive constant, but it is preferable that the reference value DSc is variably set on the basis of the drift state quantity DSs immediately before the braking starts so that it increases as the drift state quantity DSs increases. When the reference value DSc is variably set on the basis of DSs, it is possible to reduce a possibility of occurrence of a situation in which the limitation degree of the differential is started to decrease at a stage when the vehicle is not in an oversteer state, or the reduction of the limitation degree of the differential is not started despite the vehicle is in an oversteer state.

Figure 8:
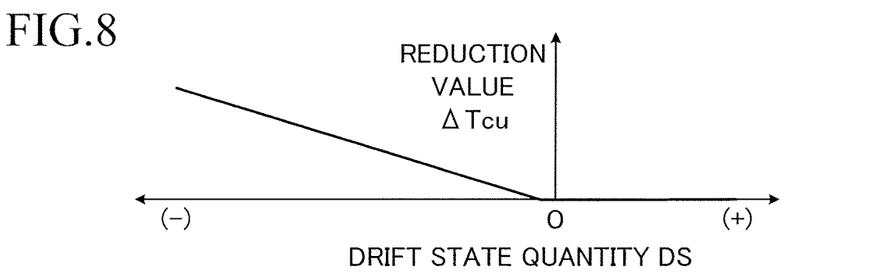
FIG. 8 is a map for calculating the reduction value ΔTcu of the coupling torque Tcu based on the drift state quantity DS.

In step 100, a reduction value ΔTcu of the coupling torque Tcu is calculated by referring to the map shown in FIG. 8 based on the drift state quantity DS. As shown in FIG. 8, a reduction value ΔTcu is calculated such that it becomes larger as the drift state quantity DS is a negative value and the absolute value of the quantity is larger, in other words, as an oversteer state of the vehicle is higher.

In step 110, a previous value of the target coupling torque Tcut is set to Tcutf, and a target coupling torque Tcut is calculated as a value Tcutf−ΔTcu obtained by subtracting the reduction value ΔTcu from the previous value Tcutf, and thereafter the control proceeds to step 120.

In step 120, a final target coupling torque Tcute is set to a larger one of the target coupling torque Tcut and 0. This process is a process for preventing the final target coupling torque Tcute from becoming a negative value.

In step 130, control of the coupling torque is executed so that the coupling torque Tcu of the center coupling conforms to the final target coupling torque Tcute.

<Operation of First Embodiment>

Next, the operation of the first embodiment in a situation where the braking operation is performed by the driver will be described.

(X1) When ABS control is executed:

Since a negative determination is made in step 40 and the target coupling torque Tcut is set to 0 in step 50, the coupling torque Tcu is controlled to 0 in step 130.

(Y1) When ABS control is not executed and the flag F is 0:

A positive determination is made in step 40 and a negative determination is made in step 60. Therefore, in step 70, a high limitation value Tcuh of the coupling torque Tcu is calculated based on the drift state quantity DS, and in step 80, the flag F is set to 1 and the target coupling torque Tcut is set to the high limitation value Tcuh. Therefore, the coupling torque Tcu is controlled to the high limit value Tcuh in step 130.

(Z1) When ABS control is not executed and the flag F is 1:

Affirmative determinations are made in steps 40 and 60. When the deviation DSs-DS between the drift state quantity DSs just before the braking start and the drift state quantity DS is equal to or less than the reference value DSc, a negative determination is made in step 90. Therefore, since the target coupling torque Tcut is not changed, the coupling torque Tcu is controlled to be maintained at the high limitation value Tcuh in step 130.

On the other hand, when the deviation DSs-DS between the drift state quantity DSs and the drift state quantity DS just before the braking start exceeds the reference value DSc, an affirmative determination is made in step 90. Therefore, in step 100, the reduction value ΔTcu of the coupling torque Tcu is calculated based on the drift state quantity DS, and in step 110, a target coupling torque Tcut is set to a value Tcutf−ΔTcu obtained by subtracting the reduction value ΔTcu from the previous value Tcutf. Therefore, the coupling torque Tcu is gradually decreased by being controlled to the value Tcutf−ΔTcu in step 130.

<Specific Example of Operation of the First Embodiment>

Figure 9:
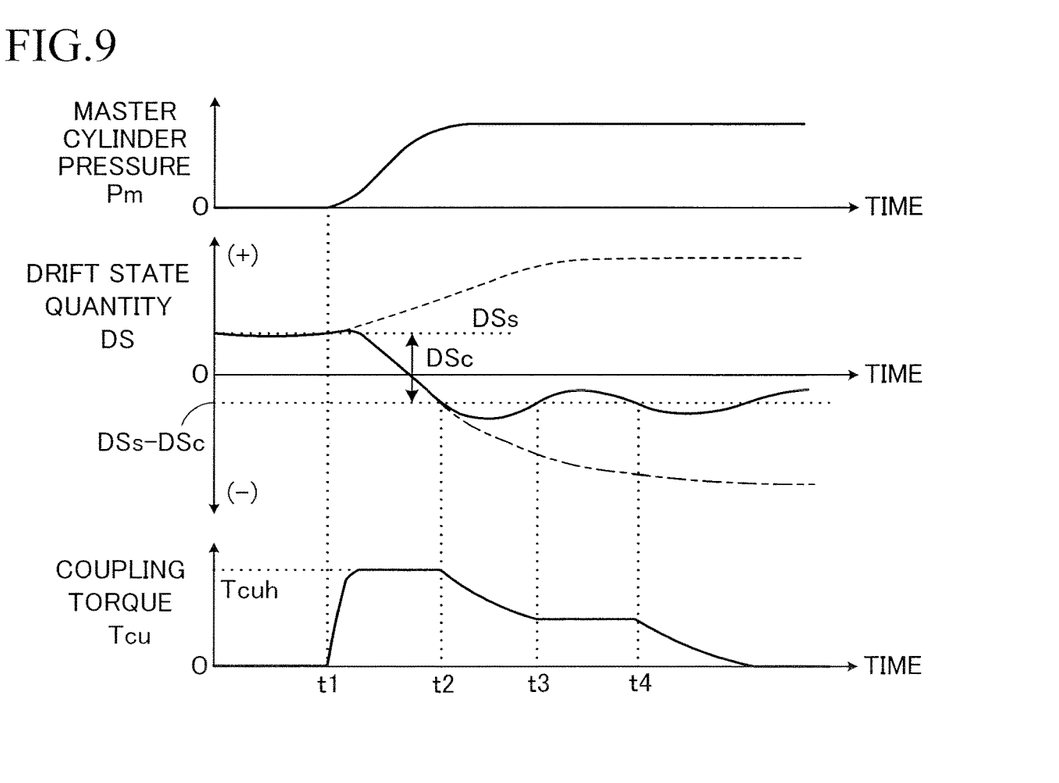
FIG. 9 is a time chart showing an example of operation of the first embodiment for a case where a braking operation is performed by a driver while the vehicle is turning in an understeer state.

Next, with reference to FIG. 9, a specific example of the operation of the first embodiment will be described with respect to a case where a braking operation is performed by a driver while, for example, the vehicle 12 is turning in an understeer state. FIG. 9 shows an example of changes in master cylinder pressure Pm (upper stage), drift state quantity DS (middle stage) and coupling torque Tcu (lower stage).

It is assumed that at time point t1, a braking operation is started by the driver, an amount of change DSs-DS of the drift state quantity DS in the oversteer direction from the drift state quantity DSs immediately before braking starts at time pt t2 exceeds the reference value DSc. Further, it is assumed that the change amount DSs-DS becomes equal to or less than the reference value DSc at time point t3 and the change amount DSs-DS again exceeds the reference value DSc at time point t4.

For a conventional case where the coupling torque Tcu is not increased even if a braking operation is performed by a driver while the vehicle 12 is turning in an understeer state, a change in the drift state quantity DS is indicated by a broken line. When the braking force of the wheels increase with the increase of the master cylinder pressure Pm, the degree of understeer condition of the vehicle tends to become high, particularly due to the decrease in lateral forces of the front wheels.

On the other hand, in the first embodiment, since the target coupling torque Tcut is set to the high limitation value Tcuh from the time point t1 to the time point t2 and the coupling torque Tcu is increased, the wheel speeds of the front and rear wheels are substantially the same and the braking slip rates of the front and rear wheels are also substantially the same. Therefore, since the braking forces of the front and rear wheels are proportional to the ground loads of the wheels, the braking forces of the front and rear wheels are controlled along the distribution line indicated by the one-dot chain line close to the ideal distribution line indicated by the broken line in FIG. 2. Therefore, the braking force Fbf of the front wheels decreases and the braking force Fbr of the rear wheels increases, and accordingly the lateral force Fyf of the front wheels increases and the lateral force Fyr of the rear wheels decreases, so that an understeer degree of the behavior of the vehicle 12 decreases.

When the target coupling torque Tcut is not reduced after the time point t2, the drift state quantity DS decreases (the absolute value increases with a negative value) as indicated by the one-dot chain line in FIG. 9, and the vehicle becomes more likely to be in an oversteer state.

On the other hand, in the first embodiment, when the deviation DSs-DS between the drift state quantity DSs just before the braking operation and the drift state quantity DS exceeds the reference value DSc from the time point t2 to the time point t3, the target coupling torque Tcut is reduced by the reduction value ΔTcu every cycle. Therefore, the drift state quantity DS decreases and then increases, and at the time point t3, it becomes the same value as the value at the time point t2. Therefore, it is possible to prevent the vehicle from being in an excessive oversteer state.

From the time point t3 to the time point t4, the deviation DSs-DS becomes equal to or smaller than the reference value DSc, so that the target coupling torque Tcut is kept constant. After the time point t4, the deviation DSs-DS exceeds the reference value DSc, so that the target coupling torque Tcut is reduced by the reduction value ΔTcu every cycle. As a result, since the drift state quantity DS approaches the value at the time point t2, it is possible to prevent the vehicle from becoming in an excessive oversteer state.

As understood from the above description, according to the first embodiment, when the behavior of the vehicle 12 is in an understeer state, the target coupling torque Tcut is set to the high limitation value Tcuh during the vehicle is braked so that the differential limitation degree by the differential limiting device 28 is increased. The braking force Fbf of the front wheels 36FL and 36FR decreases and the braking force Fbr of the rear wheels 42RL and 42RR increases, so that the lateral force of the front wheels increases and a lateral force of the rear wheels decreases. Therefore, the degree of understeer behavior of the vehicle can be reduced.

In particular, according to the first embodiment, when the change amount DSs-DS exceeds the reference value DSc, in other words, when the behavior of the vehicle 12 is in an oversteer state, the target coupling torque Tcut is gradually reduced, so that the differential limitation degree by the differential limiting device 28 is lowered. Therefore, it is possible to effectively prevent the degree of oversteer state of the vehicle from being increased due to a situation where a high degree of differential limitation is maintained for an excessively long time.

Second Embodiment

Figure 10:
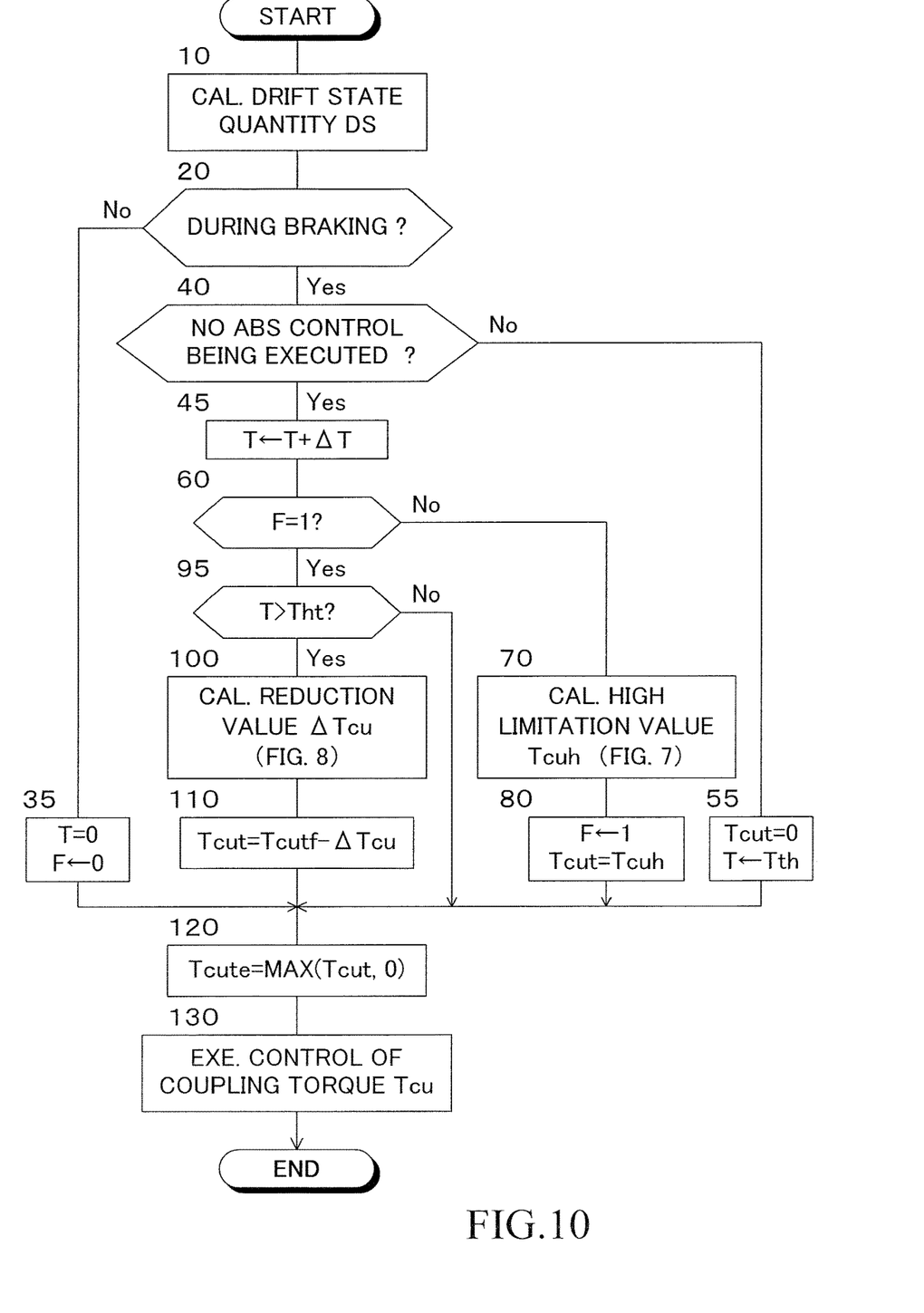
FIG. 10 is a flowchart showing a control routine of a coupling torque in the second embodiment.

In the second embodiment, the control of the coupling torque is executed according to the flowchart shown in FIG. 10. In FIG. 10, the same steps as those shown in FIG. 2 are denoted by the same step numbers as those given in FIG. 2, and a detailed description thereof will be omitted. T is an elapsed time since the control start of the coupling torque Tcu during a braking of the vehicle, and is initialized to 0 at the start of the control.

When a negative determination is made in step 20 of the second embodiment, in step 35, the elapsed time T is reset to 0 and the flag F is reset to 0, and then the control proceeds to step 120.

When a negative determination is made in step 40, in step 55, the target coupling torque Tcut of the center coupling is set to 0 and the elapsed time T is set to a reference value Tth (a positive constant). Then, the control process proceeds to step 120. On the other hand, if an affirmative determination is made in step 40, in step 45, the elapsed time T is incremented by ΔT (a positive constant which is the cycle time in the flowchart shown in FIG. 10), and thereafter the control proceeds to step 60.

When an affirmative determination is made in step 60, the control proceeds to step 95. In step 95, it is determined whether or not the elapsed time T exceeds the reference value Tth, that is, it is determined whether or not a time exceeding the reference value Tth has elapsed since the control start of the coupling torque Tcu during the braking of the vehicle. When an affirmative determination is made, the control proceeds to step 100, and when a negative determination is made, the control proceeds to step 120.

<Operation of Second Embodiment>

Next, the operation of the second embodiment in a situation where a braking operation is performed by a driver will be described.

(X2) When ABS control is executed:

Since a negative determination is made in step 40 and the target coupling torque Tcut is set to 0 in step 55, the coupling torque Tcu is controlled to 0 in step 130.

(Y2) When ABS control is not executed and the elapsed time T is equal to or less than the reference value Tth:

An affirmative determination is made in step 40 and a negative determination is made in step 60. Therefore, in step 70, the high limitation value Tcuh of the coupling torque Tcu is calculated based on the drift state quantity DS, and in step 80, the target coupling torque Tcut is set to the high limitation value Tcuh. Thereafter, an affirmative determination is made in step 60, and a negative determination is made in step 95. Therefore, the coupling torque Tcu is controlled to the high limitation value Tcuh in step 130.

(Z2) When ABS control is not executed and the elapsed time T exceeds the reference value Tth:

Affirmative determinations are made in steps 40, 60 and 95. Therefore, in step 100, the reduction value ΔTcu of the coupling torque Tcu is calculated based on the drift state quantity DS, and in step 110, the target coupling torque Tcut is set to a value Tcutf−ΔTcu obtained by subtracting the reduction value ΔTcu from the previous value Tcutf. Therefore, the coupling torque Tcu is gradually decreased by being controlled to the value Tcutf−ΔTcu in step 130.

<Specific Example of Operation of the Second Embodiment>

Figure 11:
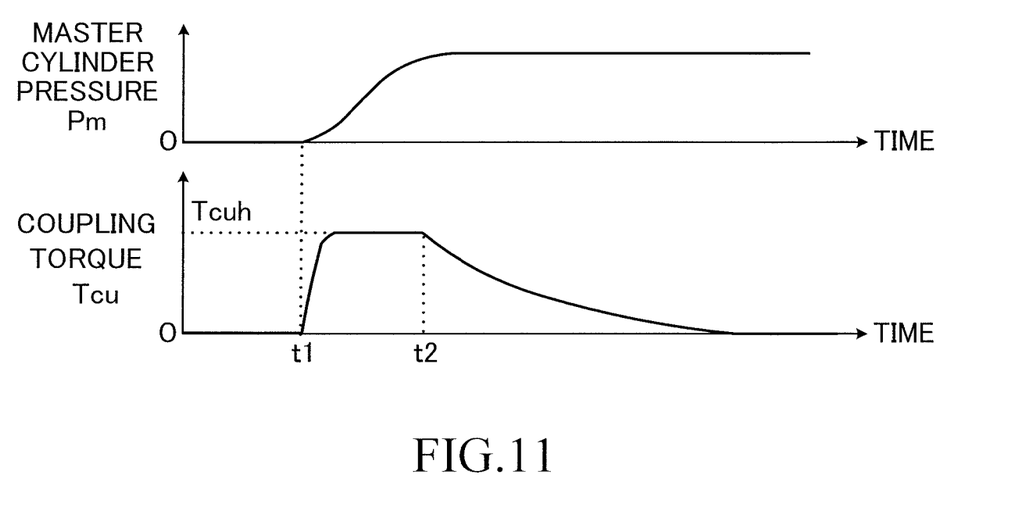
FIG. 11 is a time chart showing an example of the operation of the second embodiment for a case where a braking operation is performed by a driver while the vehicle is turning in an understeer state.

Next, referring to FIG. 11, a specific example of the operation of the second embodiment will be described with respect to a case where a braking operation is performed by a driver while, for example, the vehicle 12 is turning in an understeer state. FIG. 11 shows an example of changes in master cylinder pressure Pm (upper stage) and coupling torque Tcu (lower stage).

It is assumed that a braking operation is started by a driver at time point t1 and the elapsed time T exceeds the reference value Tth at time point t2. The target coupling torque Tcut is set to the high limitation value Tcuh from time point t1 to time point t2, and the coupling torque Tcu is increased. Therefore, even if a braking operation is performed by the driver while the vehicle 12 is turning in an understeer state, the wheel speeds of the front and rear wheels become substantially the same, and the braking slip rates of the front and rear wheels are also substantially the same, and the braking forces of the front and rear wheels become values proportional to the ground loads of the wheels. Therefore, since the braking forces of the front and rear wheels become the braking forces along the distribution line close to the ideal distribution line, the braking force Fbf of the front wheels decreases and the braking force Fbr of the rear wheels increases, and accordingly, the lateral force Fyf of the front wheels increases and the lateral force Fyr of the rear wheels decreases, so that the degree of understeer behavior of the vehicle 12 can be reduced.

Further, after the time point t2, the target coupling torque Tcut is reduced by the reduction value ΔTcu every cycle. Therefore, it is avoided that the braking force Fbf of the front wheels excessively lowers to increase the braking force Fbr of the rear wheels, whereby the lateral force Fyf of the front wheels excessively increases and the lateral force Fyr of the rear wheels excessively decreases Can be avoided. Therefore, it is possible to prevent the vehicle from being in an excessive oversteer state.

As understood from the above explanation, according to the second embodiment, the same operational effects as those of the first embodiment described above can be obtained. That is, when the behavior of the vehicle 12 is in an understeer state, the target coupling torque Tcut is set to the high limitation value Tcuh during the vehicle is braked, and the differential limitation degree by the differential limiting device 28 is increased. As the limitation degree of the differential is increased, the braking force Fbf of the front wheels decreases and the braking force Fbr of the rear wheels increases, resulting in that the lateral force of the front wheels increases and the lateral force of the rear wheels decreases accordingly, so that the degree of the understeer state of the vehicle can be reduced.

In particular, according to the second embodiment, the target coupling torque Tcut is gradually reduced when the predetermined time Tth has elapsed from the point of time when the differential limitation degree is made high, and the degree of the differential limitation by the differential limiting device 28 is lowered. Therefore, it is possible to effectively prevent the degree of oversteer state of the vehicle from being increased due to a situation where the degree of differential limitation is high is maintained for an excessively long time.

According to the first and second embodiments, a high limitation value Tcuh of the coupling torque Tcu is calculated so as to become larger as the drift state quantity DS is larger. Therefore, the degree of increase in the limitation degree of differential is increased as the degree of understeer state of the vehicle is higher. Therefore, the degree of understeer behavior of the vehicle can be properly reduced without excess or deficiency, as compared to where an amount by which the differential limitation degree is increased is constant regardless of the degree of understeer state of the vehicle. Further, the high limitation value Tcuh is calculated based on the drift state quantity DS at the time when braking is started. Therefore, the limitation degree of differential can be set according to the degree of understeer state of the vehicle at the time when braking is started.

Further, according to the first and second embodiments, the reduction value ΔTcu of the coupling torque Tcu is calculated so that, when the drift state quantity DS is a negative value, the larger the absolute value of the quantity is, the larger the reduction value is. Therefore, as the degree of oversteer state of the vehicle is higher, the degree of reduction of the limitation degree of the differential is increased, so that the effect can be increased in preventing the degree of an oversteer state of the vehicle from becoming higher as the degree of oversteer state of the vehicle is higher. Therefore, for example, as compared to where the degree of reduction in the limitation degree of differential is constant irrespective of the degree of oversteer state of the vehicle, a possibility that the effect of preventing the degree of oversteer state of the vehicle from becoming excessively excessive or insufficient can be reduced.

Furthermore, according to the first and second embodiments, the coupling torque Tcu is controlled irrespective of whether the vehicle is turning or not. Therefore, not only when braking is started during the vehicle is turning but also when turning and braking of the vehicle are started at the same time or when turning of the vehicle is started after braking is started, it is possible to prevent the oversteer state from becoming excessive.

Although the present disclosure has been described in detail with reference to specific embodiments, it will be apparent to those skilled in the art that the present disclosure is not limited to the above-described embodiments and that various other embodiments are possible within the scope of the present disclosure.

For example, in the above-described first and second embodiments, the allowable degree varying device for changing an allowable degree of a rotational speed difference between the front wheel rotating shaft 24 and the rear wheel rotating shaft 26 is an electronically controlled differential limiting device 28 provided in the center differential device 16. However, the allowance varying device may be any device known in the art as long as it is capable of changing the allowance degree of the rotational speed difference between the front wheel rotating shaft and the rear wheel rotating shaft.

In the first and second embodiments described above, a high limitation value Tcuh of the coupling torque Tcu is calculated by referring to the map shown in FIG. 7 based on the drift state quantity DS in step 70. However, the high limitation value Tcuh may be a positive constant.

Similarly, in the above-described first and second embodiments, a reduction value ΔTcu of the coupling torque Tcu is calculated by referring to the map shown in FIG. 8 on the basis of the drift state quantity DS in step 100. However, the reduction value ΔTcu may be calculated based on the change amount DSs-DS so that it increases as the change amount DSs-DS of the drift state quantity DS increases or may be a positive constant.

In addition, in the first and second embodiments described above, a drift state quantity DS of the vehicle is calculated as a part of the coupling torque control routine by the 4WD electronic control unit 30. However, the drift state quantity DS may be calculated by another electronic control unit. In particular, in a vehicle in which the behavior control of the vehicle is performed, the drift state quantity DS may be calculated by an electronic control unit for behavior control.

Further, in the first and second embodiments described above, a target yaw rate Yrt of a vehicle is calculated according to the above equations (1) and (2). However, a target yaw rate Yrt of a vehicle may be calculated according to the following equations (4) and (5). In the equation 4), Gy is a lateral acceleration of the vehicle.

$$Yrn = \frac{VSt}{NL} - KhGyV \quad (4)$$

$$Yrt = Yrn \frac{1}{1 + Ty \cdot s} \quad (5)$$

In the first embodiment described above, a reduction value ΔTcu of the coupling torque Tcu is calculated by referring to the map shown in FIG. 8 based on the drift state quantity DS in step 100. However, a reduction value ΔTcu may be calculated by referring to a map similar to the map shown in FIG. 8 based on the drift state quantity DSs immediately before the braking is started. In that case, once a reduction value ΔTcu is calculated, step 100 is not executed. That is, when an affirmative determination is made in step 90, the control proceeds to step 110.

Furthermore, in the above second embodiment, the reference value Tth of an elapsed time T is a positive constant. However, the reference value Tth may be variably set according to the drift state quantity DS, for example, such that the drift state quantity DS increases as the magnitude of the reference value increases when the quantity is a positive value.

What is claimed is:

1. A behavior control device for a four-wheel drive vehicle that is applied to a vehicle which comprises a driving device; a center differential device that transmits a driving force from the driving device to a front wheel rotation shaft and a rear wheel rotation shaft, and permits differential of the front wheel rotation shaft and the rear wheel rotation shaft; and a behavior estimation device for estimating a behavior of the vehicle, a braking force distribution ratio of the front and rear wheels being set to a value in which a ratio of front wheels is larger than that in an ideal distribution ratio based on a ground load ratio of the front and rear wheels, the behavior control device comprising a differential limiting device that changes a limitation degree of a differential between the front wheel rotation shaft and the rear wheel rotation shaft, and a control unit that controls the differential limiting device, and being configured to control a behavior of the vehicle during braking, wherein the control unit is configured to control the differential limiting device to increase the limitation degree of the differential while the vehicle is braked when a behavior of the vehicle estimated by the behavior estimation device is an understeer state.

2. The behavior control apparatus for a four-wheel-drive vehicle according to claim 1, wherein the control unit is configured to increase the degree of increase in the limitation degree of the differential as a degree of understeer state of the vehicle is higher.

3. The behavior control apparatus for a four-wheel-drive vehicle according to claim 2, wherein the control unit is configured to set a target limitation degree of the differential so that the higher the degree of the understeer state of the vehicle at the time when braking is started, the higher the target limitation degree of the differential is set, and to control the differential limiting device such that the limitation degree of the differential conforms to the target limitation degree when the vehicle is braked.

4. The behavior control apparatus for a four-wheel-drive vehicle according to claim 1, wherein the control unit is configured to calculate a drift state quantity indicative of a drift state of the vehicle, and to calculate a change amount of a drift state quantity in an oversteer direction from a drift state quantity at the time when braking is started, and to control the differential limiting device to reduce the limitation degree of the differential when the limitation degree of the differential is made high and it is determined that the change amount is higher than a reference value in a situation where the vehicle is braked.

5. The behavior control apparatus for a four-wheel-drive vehicle according to claim 4, wherein the control unit is configured to variably set the reference value based on a degree of the understeer state of the vehicle at the time when the braking is started so that the greater the degree of the understeer state of the vehicle at the time when the braking is started is, the larger the reference value is.

6. The behavior control apparatus for a four-wheel-drive vehicle according to claim 1, wherein the control unit is configured to control the differential limiting device to reduce the limitation degree of the differential when a predetermined time has elapsed from a time point when the limitation degree of the differential is increased.

7. The behavior control apparatus for a four-wheel drive vehicle according to claim 4, wherein the control unit is configured to increase a degree in reducing the limitation degree of the differential as a degree of an oversteer state of the vehicle is higher.

8. The behavior control apparatus for a four-wheel-drive vehicle according to claim 2, wherein the control unit is configured to calculate a drift state quantity indicative of a drift state of the vehicle, and to calculate a change amount of a drift state quantity in an oversteer direction from a drift state quantity at the time when braking is started, and to control the differential limiting device to reduce the limitation degree of the differential when the limitation degree of the differential is made high and it is determined that the change amount is higher than a reference value in a situation where the vehicle is braked.

9. The behavior control apparatus for a four-wheel-drive vehicle according to claim 3, wherein the control unit is configured to calculate a drift state quantity indicative of a drift state of the vehicle, and to calculate a change amount of a drift state quantity in an oversteer direction from a drift state quantity at the time when braking is started, and to control the differential limiting device to reduce the limitation degree of the differential when the limitation degree of the differential is made high and it is determined that the change amount is higher than a reference value in a situation where the vehicle is braked.

10. The behavior control apparatus for a four-wheel-drive vehicle according to claim 2, wherein the control unit is configured to control the differential limiting device to reduce the limitation degree of the differential when a predetermined time has elapsed from a time point when the limitation degree of the differential is increased.

11. The behavior control apparatus for a four-wheel-drive vehicle according to claim 3, wherein the control unit is configured to control the differential limiting device to reduce the limitation degree of the differential when a predetermined time has elapsed from a time point when the limitation degree of the differential is increased.

12. The behavior control apparatus for a four-wheel drive vehicle according to claim 8, wherein the control unit is configured to increase a degree in reducing the limitation degree of the differential as a degree of an oversteer state of the vehicle is higher.

13. The behavior control apparatus for a four-wheel drive vehicle according to claim 9, wherein the control unit is configured to increase a degree in reducing the limitation degree of the differential as a degree of an oversteer state of the vehicle is higher.

14. The behavior control apparatus for a four-wheel-drive vehicle according to claim 8, wherein the control unit is configured to variably set the reference value based on a degree of the understeer state of the vehicle at the time when the braking is started so that the greater the degree of the understeer state of the vehicle at the time when the braking is started is, the larger the reference value is.

15. The behavior control apparatus for a four-wheel-drive vehicle according to claim 9, wherein the control unit is configured to variably set the reference value based on a degree of the understeer state of the vehicle at the time when the braking is started so that the greater the degree of the understeer state of the vehicle at the time when the braking is started is, the larger the reference value is.

\* \* \* \* \*